US008171697B2

(12) United States Patent
Zimmer et al.

(10) Patent No.: US 8,171,697 B2
(45) Date of Patent: May 8, 2012

(54) ANCHOR WITH BROACHING WEBS

(76) Inventors: Günther Zimmer, Rheinau (DE); Martin Zimmer, Rheinau (DE)

( * ) Notice: Subject to any disclaimer, the term of this patent is extended or adjusted under 35 U.S.C. 154(b) by 0 days.

(21) Appl. No.: 13/065,398

(22) Filed: Mar. 21, 2011

(65) Prior Publication Data

US 2011/0232223 A1   Sep. 29, 2011

(51) Int. Cl.
*E04B 1/38* (2006.01)
*E04C 5/00* (2006.01)

(52) U.S. Cl. ............... 52/701; 52/364; 52/705; 52/707; 411/32; 411/45; 411/82.3

(58) Field of Classification Search ................. 52/125.3, 52/125.4, 125.5, 704, 705, 701, 707, 711, 52/698, 699, 364; 411/82, 82.3, 32, 45, 46, 411/49; 405/259.4, 259.5
See application file for complete search history.

(56) References Cited

U.S. PATENT DOCUMENTS

| 4,068,879 A * | 1/1978 | Torbet et al. ............ 294/89 |
| 4,428,705 A * | 1/1984 | Gelhard ................. 411/82.1 |
| 4,509,308 A * | 4/1985 | Dettfurth et al. ......... 52/787.1 |
| 4,518,292 A * | 5/1985 | Calandra, Jr. ........... 405/259.6 |
| 4,679,966 A * | 7/1987 | Yacisin ................. 405/259.6 |
| 7,413,367 B2 * | 8/2008 | Hawang ................. 403/297 |
| 2005/0123372 A1 * | 6/2005 | Sato .................... 411/32 |
| 2010/0115882 A1 * | 5/2010 | Seroiszka et al. ........ 52/787.1 |
| 2010/0180535 A1 * | 7/2010 | Zimmer et al. ........... 52/699 |
| 2010/0287875 A1 * | 11/2010 | Zimmer et al. ........... 52/699 |
| 2010/0313517 A1 * | 12/2010 | Clinch et al. ............ 52/704 |
| 2011/0027037 A1 * | 2/2011 | Zimmer et al. ........... 411/82 |
| 2011/0232224 A1 * | 9/2011 | Zimmer et al. ........... 52/699 |

* cited by examiner

*Primary Examiner* — Brian Glessner
*Assistant Examiner* — Brian D Mattei
(74) *Attorney, Agent, or Firm* — Klaus J. Bach

(57) ABSTRACT

In an anchor for use in a lightweight construction panel having upper and lower cover plates with a support core disposed therebetween, which anchor comprises a cylinder body including a cement container with rupture areas and having engagement elements which, upon insertion of a displacement body into the cylinder body, spread the engagement elements outwardly below the upper cover plate and push liquid cement out of the cement container into the areas of the upper and the lower cover plates, the displacement body is coupled to the cylinder body for rotation therewith and the cylinder body has a bottom with broaching elements for cleaning the contact area of the lower bottom plate in front of the anchor upon rotation of the displacement body during anchor installation.

10 Claims, 4 Drawing Sheets

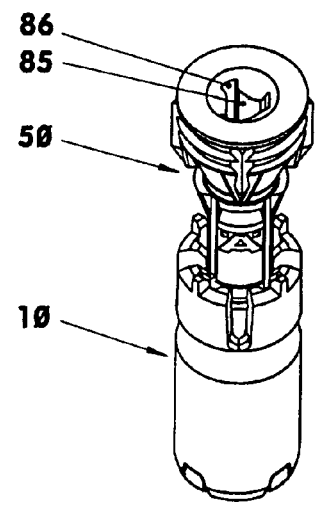
Fig. 2
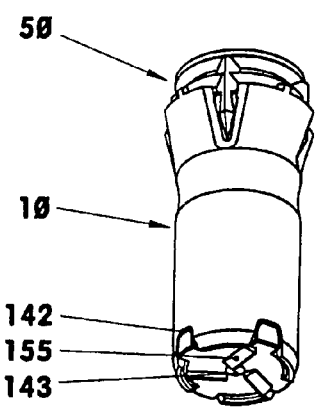
Fig. 3
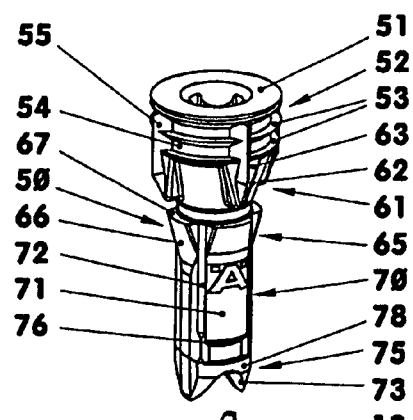
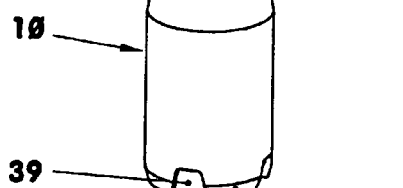
Fig. 1

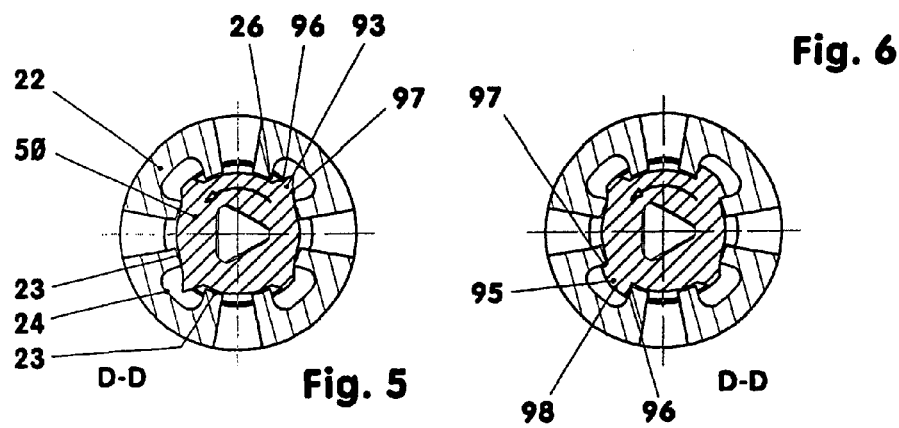
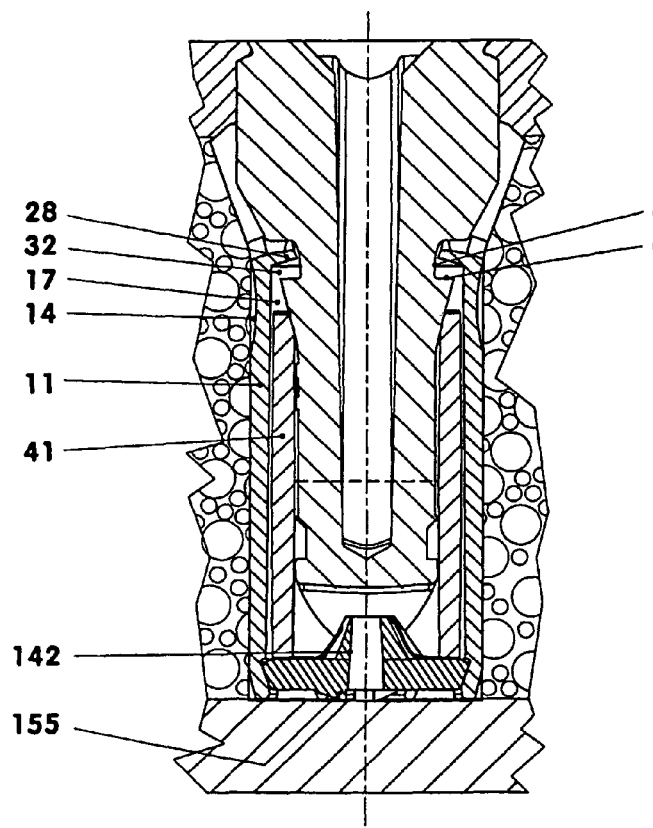

ANCHOR WITH BROACHING WEBS

BACKGROUND OF THE INVENTION

The invention relates to an anchor for use in a lightweight construction panel including upper and lower cover plates with a reinforcement structure disposed therebetween. The anchor comprises a cylinder body provided with a bottom wall, a displacement body and a cement container having predetermined rupture locations, wherein the cylinder body has at least two engagement elements which can be spread apart by the insertion of the displacement body into the cylinder body when the cylinder body is installed in a bore in the lightweight construction panel so that the engagement elements extend outwardly behind the upper cover plate and the cement container is disposed within the cylinder body which has several openings for controlling the flow of cement out of the cement container.

The lightweight construction panels, often also called sandwich panels or honeycomb panels, have in connection with furniture construction generally form-stable cover plates of thin wood chip plates, medium or high density fiber plates, plywood, or hard fiber plates. The sandwich panels include as intermediate layer or, respectively, support core for example polyurethane foam or polysterol. In honeycomb panels, as intermediate layers often corrugated web inserts, or so-called expanded honeycomb structures are used. Most lightweight construction panels have a raw density which is less than 500 kg/m$^3$. If as intermediate layers no fire-resistant aluminum foam or foamed materials are used, the raw density is below 350 kg/m$^3$. For comparison, the raw density of an uncoated wood chip plate is about 600 to 750 Kg/m$^3$.

With the attachment of armatures for example by screwing to light weight construction panels, there is a problem in that the mounting means generally are attached only to the relatively thin upper cover plate or layer.

In this connection, DE 10 2009 010 730 A1 discloses an anchor consisting of at least two parts which are moved into one another during the anchor installation. An at least partially pot-shaped component acts herein as a cylinder whereas a pin-like component takes on the function of a piston. In the bottom part of the pot-shaped component a cement cartridge is disposed which ruptures at the top and at the bottom when the two components are pushed into one another.

It is the object of the present invention to provide a cement anchor for lightweight construction panels which is easy to install but is firmly and durably held in its position in the lightweight construction panel.

SUMMARY OF THE INVENTION

In an anchor for use in a lightweight construction panel having upper and lower cover plates with a support core disposed therebetween, which anchor comprises a cylinder body including a cement container with rupture areas and having engagement elements which, upon insertion of a displacement body into the cylinder body, spread the engagement elements outwardly below the upper cover plate and push liquid cement out of the cement container into the areas of the upper and the lower cover plates, the displacement body is coupled to the cylinder body for rotation therewith and the cylinder body has a bottom with broaching elements for cleaning the contact area of the lower bottom plate in front of the anchor upon rotation of the displacement body during anchor installation.

With the present invention, a so-called hydraulic cement anchor is provided basically in the form of a cylinder piston unit. As commercially available, the cylinder is a single- or multi-chambered container filled with a flowable cement. When the cement anchor is inserted into a bore in a lightweight construction panel and then the displacement body is pushed into the cylinder body, first the cement container is pushed open at the top by the displacement body. The displacement body then entering the cement container and displaces the cement in a direction opposite to the movement of the displacement body into the area below the upper cover plate. Upon further advance movement of the displacement body, the cement container is pressed against the cylinder bottom so that the cement container ruptures at the bottom. The displacement body now pushes the remaining cement through the openings of the lower cylinder area into the area around the lower end of the anchor. With the advance movement of the displacement body, the still flowable cement is conducted via bores and channels to all those locations where it is needed for holding the anchor in the lightweight construction panel. After the telescopic compression of the cylinder body and the displacement body, the cement solidifies and fixes the anchor durably in the lightweight construction panel. At the same time, the displacement body is cemented to the cylinder body.

In order to ensure a firm attachment of the cement anchor to the lower cover plate of the lightweight construction panel, the area of the cover plate below the anchor, that is, the bottom of the anchor, which is cemented to the cover plate, is cleaned by special broaching webs, that is loose boring residues are removed. The broaching webs are disposed at the bottom of the cylinder body. In order to realize the cleaning, the cement anchor is rotated during its insertion at least at the end of the insertion stroke. The cement anchor is engaged during machine-installation with the displacement body and is guided thereby. The displacement body and the cylinder body are joined by means of a rotationally fixed coupling permitting however relative longitudinal movement.

The invention will become more readily apparent from the following description of an exemplary embodiment thereof with reference to the accompanying schematic drawings.

BRIEF DESCRIPTION OF THE DRAWINGS

FIG. 1 is a perspective exploded view of the anchor,

FIG. 2 is a perspective view of the anchor as it is commercially available,

FIG. 3 shows the anchor of FIG. 2 in a telescopically compressed state,

FIG. 5 is a cross-sectional view of the anchor of FIG. 4 showing the force-locking coupling, FIG. 6 is a cross-sectional view, showing a form-locking engagement, FIG. 7 is the same as FIG. 4 after the insertion stroke.

DESCRIPTION OF A PARTICULAR EMBODIMENT

Figure 4:
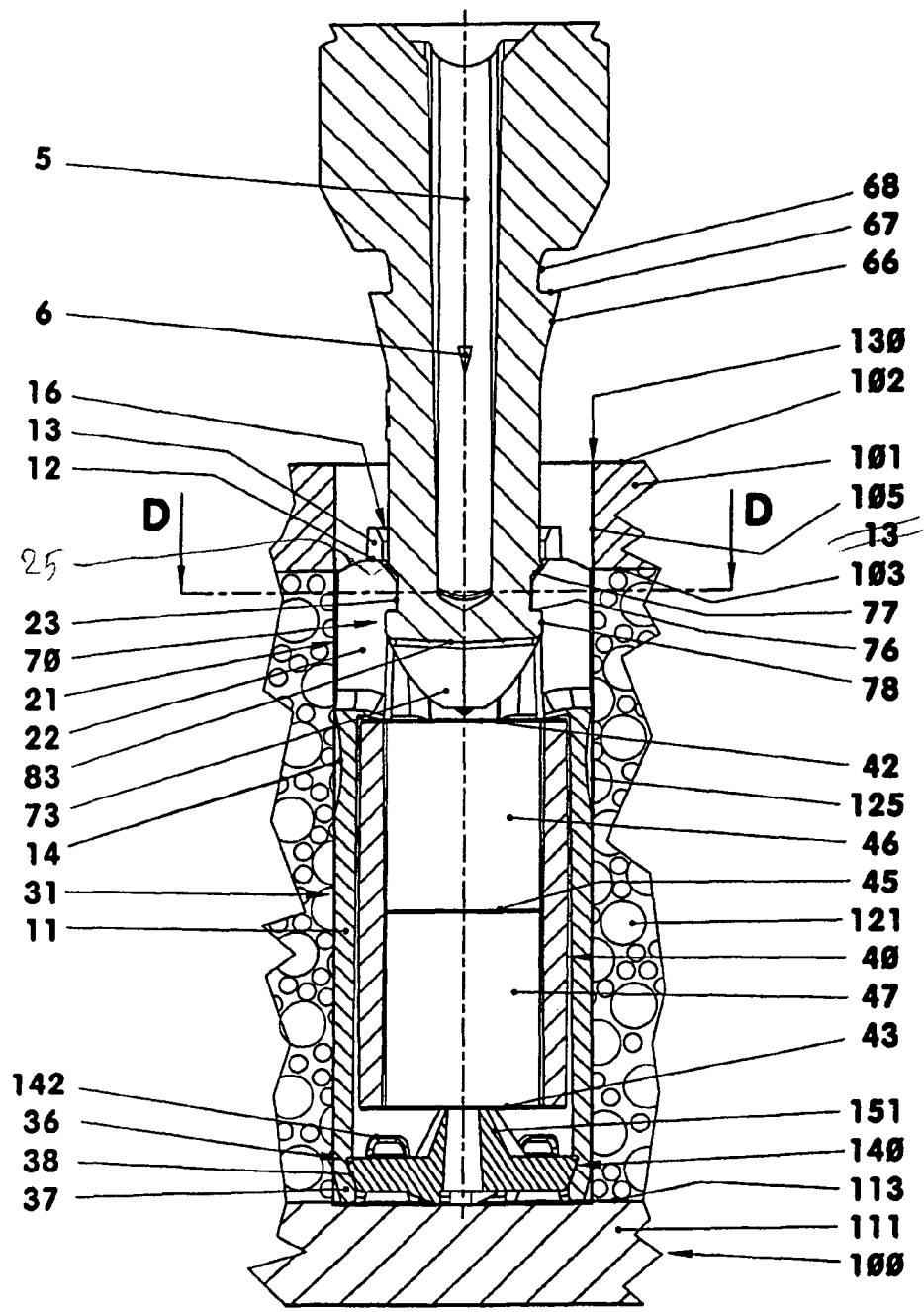
FIG. 4 is a longitudinal cross-sectional view of the anchor of FIG. 2 inserted into a lightweight construction panel.
Figure 8:
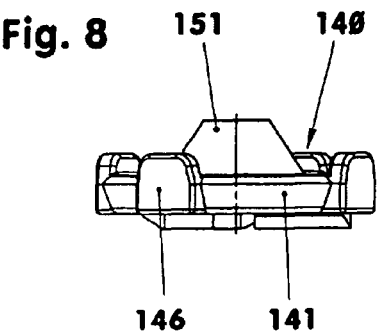
FIG. 8 is a side view of the anchor bottom.

FIG. 1 shows the various components of a cement anchor in an exploded representation of the anchor. It includes a cylinder body 10, a displacement body 50, a cement container 40 with for example two chambers and a bottom 140. All components are held together by the cylinder body 10. From the top, the displacement body 50 is inserted into the cylinder 10 up to a point and is engaged therein in that position, see FIG. 2. From below, the cement container 40 is inserted into the cylinder body 10 and is retained in position by the bottom 140. The cement anchor is inserted into the lightweight construction panel 100 by an installation apparatus, which is not shown, and is rotated by the installation machine about the longitudinal axis of the anchor.

FIG. 2 shows the cement anchor in the form as it is commercially available while FIG. 3 shows the cement anchor telescopically pushed together in a state as it is present when installed in a lightweight construction panel. The cement flowed out of the openings 16, 143 and the installation gaps 142 is not shown.

FIG. 4 shows the cement anchor of FIGS. 1-3 in a longitudinal cross-sectional view. Its cylinder body 10 is shown disposed in a lightweight construction panel 100.

The lightweight construction panel 100 as shown in FIG. 4 comprises upper and lower cover plates 101, 111 and a support core 121 disposed therebetween. In the shown embodiment, each cover plate consists of a thin particle board. The support core 121 is here for example a PU foam core. The cover plates 101, 111 are cemented with their inner surfaces 103, 113 to the plate-like support core 121. The lightweight construction panel shown herein has a wall thickness of 20-40 mm. Each cover plate is for example 2 to 8 mm thick. Instead of the foam core, among others a honey comb core may be provided. The lightweight construction panel 100 includes a bore 130 comprising sections 105 and 125.

The lightweight construction panel 100 may also be curved, for example cylindrically or spherically arched as long as the material thickness of the support core 121 remains at least essentially constant.

For the installation of the cement anchor, a bore is drilled through the first cover plate 101 and the support core 121. The second cover plate 111 may be slightly cut for the complete removal of cement rests which may be present at its inner surface. As boring tool for example, a spiral drill is used which has a tip angle of 180°. If expedient, also a spot facer may be used. Depending on the type of anchor also a step facer may be used for drilling the bore 130. The cavity or, respectively, bore 130 formed thereby is blown out for example by compressed air or is suctioned out.

When assembled, the cylinder body 10 is a pot-shaped component which consists of a tubular section 11 and a bottom 140. In the exemplary embodiment, the bottom 140 is engaged in the tube section 11. The engagement is effective in radial, in axial and in circumferential direction.

The tubular section 11 as shown in FIGS. 1 and 4 consists for example of the plastic material ABS and has largely an at least approximately cylindrical outer wall. The tubular section 11 comprises three larger areas. The first area is the engagement area 21 with the upper cavity 16 or, respectively, opening. In the exemplary embodiment, it has four for example straight longitudinal slots 27, see FIG. 1. The longitudinal slots 27 separate for example four engagement elements 22 of the same size.

Each engagement element 22 consists primarily of a hook-shaped block, see FIG. 4, which is connected to the second area 37 of the tubular section 31 of the tube section 11 by way of a narrow, thin-walled hinge zone 32, see. FIG. 7. The inner wall structure of the individual engagement elements 22 comprises two support areas 23 and an intermediate channel 24, see FIG. 5. The support areas are partial surface areas of a cylinder envelope. The diameter of the cylinder envelope in the area of the support areas 23 corresponds about to half the maximum diameter of the outer wall of the tubular section 11.

The channels 24 disposed between the support surfaces 23 have an oval cross-section which is open toward the center line 5. The depth of the channels 24 as measured with respect to the cylinder envelope of the support surfaces 23 is for example 1 to 1.2 mm.

The engagement elements 22 are provided at their front faces 12 for example with four at least approximately parallelopiped guide pins 13 which are chamfered at their inner surfaces. The guide pins 13 end in radial direction in alignment with the outer wall. They have an average wall thickness of about 1 mm. Behind each guide pin 13, there is a channel 24. The respective rear channel 24 enhances the inward bending of the guide pin 13 during installation of the anchor.

The lower end of the individual longitudinal slots 27 has a particular shape, see FIG. 7. There is a narrow, about 0.3 mm thick elastic sealing tongue 28 extending from the lower end bent at least essentially horizontally inwardly about 1 mm into the interior space 17. It serves at the same time as upper stop for fixing the cement container 40, see FIG. 4.

Between the front face 12 and the support surfaces 23 as well as the channels 24, there is for example a 45° chamfer where the displacement body 50 abuts with its rear blocking areas 77 as shown in FIG. 4. At the same time, the displacement body 50 is in contact, by way of the engagement projections 78, with the engagement surfaces 25 of the engagement elements 22.

The second area 31 of the tubular section 11 is the cartridge support area. This area 31 has an at least approximately cylindrical inner wall which becomes slightly wider toward the bottom, see FIG. 4. There, the wall has a wall thickness of for example 0.8 mm.

The outer wall of the tubular section 11 has for example in its upper quarter section narrowed areas 14. The narrowed areas 14 have the form of a circumferential annular groove. The cross-sectional area of the annular groove is for example in the form of a circle segment whose radius is for example 8 mm. In the range of the narrowed area 14, the wall thickness of the tubular section 11 is reduced by at least one third. In this way, the tubular section 11 has in the reduced diameter area a greater elasticity than in the cylindrical area therebelow. In this way, the resiliency needed for spreading apart of the engagement elements 22 in the hinge zone 32 is increased.

The third area 36 of the tubular section 11 is the bottom stop area. It consists for example of four downwardly extending elastic tongues 37; see FIGS. 1 and 3, which are separated from one another by short longitudinal slots 39. On the inner wall of the tongues 37, that is, on the lower two thirds of the tongues, there is an annular recess 38 which serves as seat for the cylinder bottom 140, see FIGS. 4 and 7.

The cylinder bottom which consists for example of ABS is essentially a disc with an outer wall 141 largely in the form of a truncated cone, see FIGS. 8-11. It has a central opening 143. At its outer wall 141, for example, four drive shackles 146 are provided. They project beyond the outer wall 141 for engagement in corresponding recesses or slots 39 of the tubular section 11 with a play of 0.1 to 0.3 mm. The inner and outer walls of the driver shackles 146 are essentially flush with the inner and outer walls of the tubular section 11. The driver shackles 146 extend over the top side 144 of the bottom 140 by about 0.9 mm. The extending part of the driver shackles 146 narrows down slightly toward the top.

Figure 10:
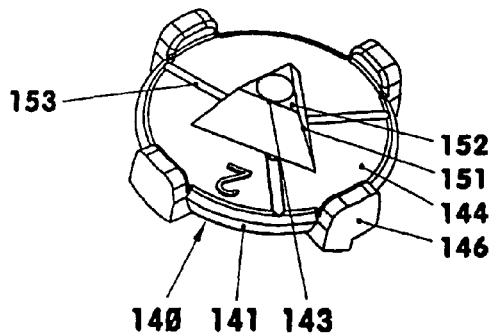
FIG. 10 is a perspective top view of the anchor bottom.
Figure 13:
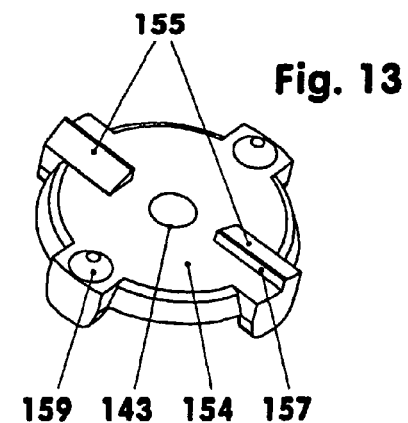
FIG. 13 is a bottom view of the anchor showing a different type of broaching webs.

At its top side 144, the bottom 140 is provided with a central truncated pyramid structure 151 whose base is for example an equal sided triangle, see FIG. 10. The truncated pyramid 151 has a height of about 2.25 mm. In the center of the truncated pyramid 151, a throughbore 143 is provided. The edges of the front face 152 are tangential to the bore 143. The corner circle of the front face 152 has a diameter of for example 3 mm, whereas the corner circle of the pyramid base has a diameter of about 6.2 mm.

Expediently, the top side 144 of the bottom 140 includes for example three or more channels 153 which have a cross-section of at least two square millimeters each. They extend from the truncated cone 151 to the outer wall 141 for conducting cement from the cement container 40 to the tubular section 11.

At its lower side 154, the bottom 140 is provided with for example three broaching webs 155. The broaching webs 155 which project 0.1 to 0.3 mm over the lower edge of the tubular section 11 have the purpose to remove the support core cementing rests and the support core rests which remained on the lightweight construction panel bore below the anchor bottom 140.

The broaching webs 155 have for example a triangular or trapezoidal cross-section. They have at their front a broaching area 157 and at their back side a free area 158. The broaching area 157 and the free area 158 join at the broaching edge 156. The latter may also be a narrow longitudinal surface area.

Figure 11:
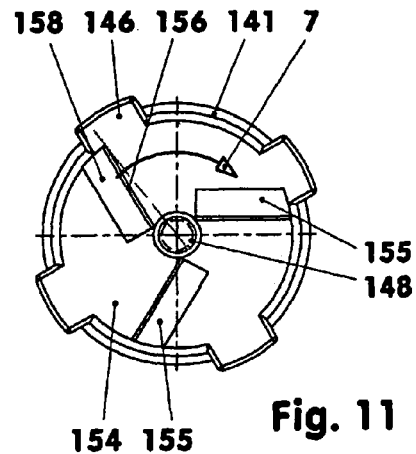
FIG. 11 is a bottom view of the anchor.
Figure 9:
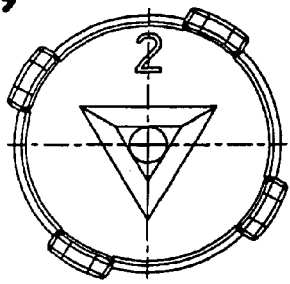
FIG. 9 is a top view of the anchor bottom.
Figure 12:
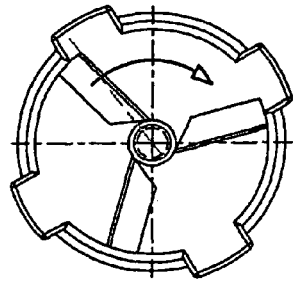
FIG. 12 is a bottom view of the anchor which includes broaching webs arranged at an angle different from that shown in FIG. 11.

The broaching area 157 forms with the underside 154 for example an angle of 90±10 degrees. The angle formed between the free area 158 and the lower side 154 is for example 20±5°. The broaching area 157 has a height of for example 0.5 mm, whereas the free area has a depth of 1 to 1.3 mm. The broaching webs extend essentially radially from the center outwardly. At the inner end, they are in the immediate proximity of the central opening 143. Their outer ends are in the area of the outer wall 141. As shown in FIG. 11, the broaching edges 156 are tangential to an imaginary circle 148 whose diameter is smaller than, or equal to, the diameter of the opening 143. The broaching edges 156 are here negatively inclined so that their inner ends are more spaced from a radial line than their outer ends, contrary to the arrangement as shown in FIG. 12.

In the embodiment of FIG. 5, only two radially oriented broaching webs 155 are used. As shown, they extend up to the area of the driver shackles 146. However, in the shown embodiment, the broaching webs extend inwardly not all the way to the opening 143. They are spaced therefrom for example by 1 mm.

At the lower side, truncated cone-shaped support legs 159 are arranged in the area of the driver shackles 146 where there are no broaching webs 155. The height of the support legs is 0.1 to 0.2 mm less than that of the broaching webs 155.

The broaching webs may have almost any cross-section; they may for example be in the form of an equal-sided triangle, a rectangle, a square, a section of a circle etc. At the same time, the broaching edge 156 may be a straight line as shown in FIGS. 1-13, a sickle-shaped line, a spiral line, an S-shaped line or it may follow a continuous or discontinuous curve. The broaching edges 156 may also be interrupted in areas wherein the interruption of the broaching edges 156 are radially displaced.

The bottom 140 may also be not in the form of a circular disc but in the form of a star or a polygonal structure.

The cement cartridge 40 is essentially a cylindrical tube 41, which, at each of its planar end faces which extend normal to the center line 5, is closed by a PE coated aluminum foil 42, 43. The aluminum foil 42, 43 forms a desired rupture area. Expediently, it may also be provided with special perforations or groove-like reduced thickness areas of low rupture resistance.

The tube 41 which consists of PE-RD has for example an outer diameter of 8 mm and a wall thickness of for example 0.9 mm. In the exemplary embodiment, it is filled with 0.3 to 0.4 milliliter of cement.

As shown in FIG. 4, the cement cartridge 40 is divided at its center by an intermediate wall 45. The intermediate wall 45 which can be pierced by the displacement body 50 has a wall thickness of for example 0.1 to 0.2 mm. Its rupture resistance corresponds at least to the rupture resistance of the cover foils 42, 43. Also, the intermediate wall 45 may have additional perforations or areas of reduced thickness.

With the aid of the intermediate wall 45, the cement can be distributed in a controlled manner to the upper cover plate 101 and the lower cover plate 111.

In connection with certain anchor sizes and/or special support core materials also a cement cartridge 40 may be used which has no intermediate wall 45.

The cement is for example a single-component moisture hardening reaction cement on polyurethane basis. Upon exposure to moisture, the cement material hardens while slightly foaming forming a water-resistant hard cement film. The curing time for example for a 40% hardening at room temperature of 20° C. is five to fifteen minutes. The viscosity is 7000±2000 mPA*s.

Expediently, thin, short plastic fibers are admixed to the cement. The plastic fibers are in any case shorter than one millimeter. They have a diameter of about 40 micrometers. The volume content of the plastic fibers is at least 15%.

The cement cartridge 40 is engaged between the sealing tongues 28 of the tubular section 11 and the front face 152 of the bottom 140 with little or no play in the axial direction.

The single part displacement body 50 which consists of the plastic material ABS is provided at its outside with four zones, an upper clamping zone 52, a wedging zone 52, a reflux zone 65 and a lower holding zone 75. A central opening 85 extends through the upper three zones and ends in the lower holding zone 75.

The upper clamping zone which, after installation of the anchor, is disposed in the bore 105 of the upper cover plate 101, has an approximately cylindrical shape. The outer wall of this cylindrical member is highly structured. It is provided for example with two circumferential grooves 54 disposed between five at least partially closed circumferential webs 53 which are interrupted for example by four circumferentially equidistantly distributed vertically extending clamping webs 55.

In the area of the wedging zone 61, the displacement body 30 becomes narrower by about 55% of its outer diameter. On the truncated cone-shaped outer surfaces of the wedging zone 61, four equidistantly distributed wedging elements 62 are provided. The wedging elements 62 which are pointed downwardly have a planar surface 63 and are inclined for example by 6° with respect to the center line 5, so that the respective tips of the wedging elements 62 have the shortest distance from the center line 5.

Upon installation of the anchor, the wedging elements 62 are disposed in the spread-apart longitudinal slots 27 between the engagement elements 22 wherein the lower tips of the wedging elements 62 are disposed at the base of the V-shaped longitudinal slots 27. The side flanks of the engagement elements 22 then abut the side walls of the slots so as to prevent relative rotation.

Below the wedging zone 61, there is the reflux zone 65. The center area of the reflux zone 65 is formed by a cylindrical section 71 on which four rotation-preventing coupling webs 72 are arranged evenly spaced around the circumference. The coupling webs 72 start below the wedging element 62 displaced from the center, see FIGS. 1 and 2, and end in the area of the holding zone 75 of the displacement body 50.

In the cylinder section 71, expediently, at least one circumferentially annular groove is formed which, at the largest diameter of the cylinder section 71, has a depth of up to 0.5 mm. In the annular groove, cement 9 is collected during installation of the anchor so as to improve the connection to the hub 41.

In FIGS. 1 and 2, at the transition of the wedging zones 61 and the reflux zone 65, a truncated cone-shaped locking ring 66 is provided which, accommodates the coupling webs 72. The locking ring 66 has for example a cone angle of 30°. The theoretical tip of the truncated cone-shaped ring 66 is disposed on the center line 5 in the area of the holding zone 75. Between the locking ring 66 and the Wedging elements 62, there is an annular groove 68. Toward the wedging elements 62, the locking ring 66 has for example a planar support surface 67.

The lowermost area of the displacement body 50 is the holding zone 75. Within this zone, the coupling webs 72 extend downwardly. Each second coupling web 72 is widened for forming a shaft-rim coupling, see FIGS. 5, 6.

FIG. 5 shows the web widening areas 93 of the coupling webs 72 provided with a triangular individual cross-section. These web widening areas 93 extend with their support and holding flanks 96, 97 into the channels 24. They occupy the channels 24 however only partially. When now the displacement body 10 is rotated during installation about its centerline 5 in the direction of rotation 7 of the anchor, the support flanks 96 abut the nearest channel edges 26 and also rotate the cylinder body 10.

As shown in FIG. 6, widened web areas 95 are used with rectangular individual cross-sections. In this case, the widened web areas have support flanks 96 which abut the side walls of the channel 24 are a relatively large area. At the same time, the holding flank 97 is in contact with the other wall of the channel 24. The contact area here is somewhat smaller. Although between the back flank 98 of the widened web 95 and the wall of the channel 24 more than half of the channel cross-section remains free—for the later transport of the cement—the displacement body 50 is in engagement with the cylinder body 10 for play-free rotation therewith in the direction of rotation.

At the lower front face 83, the displacement body 50 carries two edge-shaped tips 73 which project downwardly about 2.5 mm beyond the front surface 83. The diagonally opposite outer surfaces have a distance from each other which is slightly smaller than the inner diameter of the tube 41 of the cement cartridge 40.

Above the front face 83, an about 0.45 mm outwardly projecting engagement projection 78 is provided between in each case two tips 73.

In the upper front face 51, a central, at least partially truncated cone-shaped opening 85 is provided whose centerline coincides with the center line 5, see FIG. 2. The opening 85 has three or more radially inwardly extending webs 86 which end shortly ahead of the holding zone 75. Between the front face 51 and the opening 85, there is for example a 0.1×45° chamfer.

The opening 85 has in its upper area—not considering the webs 86—for example, a diameter of 4.2 mm. The inner circle formed here between the webs 86 has a diameter of about 2 to 3 mm, wherein the webs 86 have at their tips a width of about 2.5 mm. The front edges of the webs 86 which border the inner circle extend consequently parallel to the center line 5.

The mounting elements are for example particle board screws of the sizes, in millimeter, 3.5×25 or 4×25.

The opening 85 may of course have also nearly any other cross-sections, that is it may be oval, polygonal, multicornered or star-shaped for example. The opening may also have the form of a short straight cone. In this case, the mounting element must itself generate the largest part of the mounting bore.

In the exemplary embodiment, the cavity 85 is provided for a robot installation of the cement anchor. Furthermore, it has the purpose to guide the mounting element, for example one of the screws mentioned above so that it does not stray off the center line 5.

For installing the cement anchor into the bore 130 of the lightweight construction panel 100, the anchor is generally inserted in a single stroke. At least during part of this stroke the cement anchor is rotated about its longitudinal axis. With the spreading apart of the engagement elements 22 and the shape of the clamping zone 52, the anchor is firmly held in position in the bore 130 already before complete curing of the cement.

In the following text, the fixing of the anchor will be described in individual separate steps although the procedure is performed in a single continuous insertion stroke.

FIG. 4 shows an anchor in the form in which it is commercially available, but which has already been inserted into a prepared bore 125 formed into the lightweight construction panel 100. The cylinder body 10 is disposed on the inner surface 113 of the lower cover plate 111. The upper front face 12 of the cylinder body 10 is disposed herein for example 0.5 mm below the inner surface 103 of the upper cover plate 101. In the cylinder body 10, the still closed cement cartridge 40 is disposed. Above the cement cartridge 40, the displacement body 50 is arranged above its holding zone 75 in the engagement area 21 of the cylinder body in its first position. Its tips 73 are not in contact with the cement cartridge 40.

The insertion occurs for example first without rotation of the anchor. The anchor is rotated only when the bottom 140 of the cement anchor or respectively the broaching webs 155 are spaced from the surface 113 of the lower cover plate 111 by about 3 mm. Then, the cement anchor is rotated with a speed of 180-900 rpm for example in a counterclockwise direction. Over the last millimeter of its stroke, the broaching webs 155 remove residues of the support core 121 adhering to the surface 113 and cement by which the support core was connected to the cover plate 111 in the area of the bore 130. The residues are displaced sidewardly or, for example, with a large cell cardboard honey-comb structure are thrown off to the side 18. When the anchor reaches its end position as shown in FIG. 4, the anchor rotation continues for a few seconds.

In a second step, the displacement body 50 is moved into the cylinder body 10 in the installation direction 6. In the process, the blocking areas 77 force the engagement elements 22 apart. The edge-shaped tips 73 rupture the upper cover foil 42 of the cement container 40. The liquid cement is displaced out of the upper container area 46 and conducted via the longitudinal slots 27 and the channels 24 upwardly toward the upper cover plate 101. The second step is completed when the tips 73 have reached the intermediate wall 45.

In a third step, the downwardly moving displacement body 50 presses the tube 41 with a large force against the truncated pyramid structure 151 of the bottom 140. This causes the rupture of the lower cover foil 43. The tube 41 hits the top side 144 of the bottom 140. With the resulting stop force, the tips 73 break down the intermediate wall 45. Now also the cement of the lower cement containing area 47 is displaced downwardly toward the lower cover plate 111. It flows via the opening 143 and the gaps 142 into the area between the support core 121 and the lower cover plate 111.

In a fourth step, first the locking ring 66 and then the wedge elements 62 spread the engagement elements 22 apart. In the process, the guide pins 13 have started to bend over toward the front faces 12 of the engagement elements 22. During this step, a further part of the cement is moved upwardly. This cement movement is completed only when the sealing tongues 28 are engaged in the annular groove 68 above the support surface 67. At the same time, the sealing tongues 28 prevent a backflow of the cement to the lower areas of the anchor.

The anchor installation is completed when the engagement elements 22 have been fully spread apart by the wedging zone 61, see FIG. 7. The guide pins 13 which are not visible in FIG. 7 fully abut the front face 12 and press from the bottom against the inner surface 103 of the upper cover plate 101.

During the fourth step, the clamping zone 52 has been pressed into the bore 105. Herewith, the circumferentially extending webs 53 were firmly engaged in the lower layers of the cover plate 101 whereas the upper areas of the clamping webs 53 were embedded in the generally harder surface layer of the cover plate 101.

At a later time, for example, after about five minutes, the cement has sufficiently hardened for the preliminary mounting. Into the unit which consists for example of a tough elastic material, then a screw can be installed already during the final curing process.

The upper front face 51 of the clamping zone 52 is disposed in the exemplary embodiment in the plane of the outer cover plate surface 102. In praxis, the front face 51 is usually disposed by one to two tenths of a millimeter below the above-mentioned plane.

In all the shown cement anchors the cylinder body 10 may be extended and be accommodated in a dead end bore formed into the lower cover plate 111, see DE 10 2006 049 954 A1.

The opening elements 73, 151 are pointed plastic parts of the displacement body 50 and the bottom 40. Of course, they may also be injected or inserted sharp-edged parts such as razor blades or similar structures.

| Parts list | |
|---|---|
| 5 | Center line |
| 6 | Installation direction |
| 7 | Direction of rotation |
| 9 | Cement |
| 10 | Cylinder body |
| 11 | Tubular section |
| 12 | Front faces |
| 13 | Guide pins |
| 14 | Narrowed area |
| 16 | Opening |
| 17 | Interior space |
| 21 | Engagement area |
| 22 | Engagement element |
| 23 | Support surfaces |
| 24 | Channel |
| 25 | Engagement surface |
| 26 | Channel edges |
| 27 | Longitudinal slot |
| 28 | Sealing tongue |
| 31 | Second area |
| 32 | Hub zone |
| 36 | Third area |
| 37 | Tongues |
| 38 | Annular recess |
| 39 | Longitudinal slots |
| 40 | Cement container |
| 41 | Tube |

-continued

| Parts list | |
|---|---|
| 42 | Aluminum foil |
| 43 | Aluminum foil |
| 45 | Intermediate wall |
| 46 | Cement container area |
| 47 | Lower cement container area |
| 50 | Displacement body |
| 51 | Upper front face |
| 52 | Clamping zone |
| 53 | Circumferential webs |
| 54 | Circumferential grooves |
| 55 | Clamping webs |
| 61 | Wedging zone |
| 62 | Wedging elements |
| 63 | Surface |
| 65 | Reflux zone |
| 66 | Locking ring |
| 67 | Support surface |
| 68 | Annular groove |
| 70 | Shaft-hub connection |
| 71 | Cylinder section |
| 72 | Coupling webs |
| 73 | Tips |
| 75 | Holding zone |
| 76 | Support surfaces |
| 77 | Blocking areas |
| 78 | Engagement projection |
| 83 | Lower front face |
| 85 | Central opening |
| 86 | Webs |
| 93 | Web widening |
| 95 | Web widenings |
| 96 | Support flanks |
| 97 | Holding flanks |
| 98 | Back flank |
| 100 | Lightweight construction panel |
| 101 | Upper cover plate |
| 102 | Outer surface |
| 103 | Inner surface |
| 105 | Bore section |
| 111 | Lower cover plate |
| 113 | Inner surface |
| 121 | Support core |
| 125 | Bore section |
| 130 | Bore |
| 140 | Bottom |
| 141 | Outer wall |
| 142 | Gap |
| 143 | Opening |
| 144 | Top side |
| 146 | Driver shackles |
| 148 | Circle |
| 151 | Truncated pyramid structure |
| 152 | Front face |
| 153 | Channel |
| 154 | Lower side |
| 155 | Broaching webs |
| 156 | Broaching edge |
| 157 | Broaching area |
| 158 | Free area |
| 159 | Support legs |

What is claimed is:

1. An anchor for use in connection with a lightweight construction panel (100) having an upper cover plate (101) and a lower cover plate (111) with a support core (121) disposed therebetween, said anchor comprising a cylinder body (10) having a bottom (140), a displacement body (50) and a cement container (40) provided with desired rupture structures, the cylinder body (10) including at least two engagement elements (22) which, upon insertion of the displacement body (50) into the cylinder body (10), are spread apart below the upper cover plate (101) when the anchor is disposed in a bore (130) in the lightweight construction panel, the cement container (40) being disposed within the cylinder body (10) which includes several openings (16, 142, 143) the displacement body (50) and the cylinder body (10) having at least over part of their length a shaft and hub coupling (70) providing for a rotationally fixed, but longitudinally relatively moveable, connection to permit rotating of the cylinder body (10) by the displacement body (50), said cylinder body bottom (140) having a lower face with at least one broaching web (155) for removing any residual material from the surface area of the lower cover plate (111) adjacent the anchor by the rotation of the anchor when it approaches the lower cover plate (111).

2. The anchor according to claim 1, wherein the broaching web (155) includes a broaching edge (156) which extends at least partially in a plane that extends transverse to the center axis (5) of the anchor.

3. The anchor according to claim 1, wherein the broaching edge extends along a straight line.

4. The anchor according to claim 1, wherein the broaching edge (156) extends essentially radially from the center area to the outer area and, in the center area, is tangential to a circle (148) whose center point is disposed on the center line (5) of the anchor and whose diameter is 2 to 5 mm.

5. The anchor according to claim 1, wherein for forming a shaft-to-hub connection (70), the displacement body (50) includes at least one coupling web (72) which is engaged in a coupling groove (24) formed into cylinder body (10).

6. The anchor according to claim 1, wherein the cylinder body (10) comprises a tubular section (11) and a bottom (140).

7. The anchor according to claim 6, wherein, before insertion, the bottom (140) is disposed in the cylinder body (10) so as to be fixed in axial, in radial and in a circumferential direction in at least one of a form-and-material locking way.

8. The anchor according to claim 1, wherein the cement container (40) is a cylindrical tube (41) which at its front ends is closed by gas and liquid-tight foils (42, 43).

9. The anchor according to claim 8, wherein the gas- and liquid tight foils (42, 43) have a rupture resistance of less than 10 $Nm^2$.

10. The anchor according to claim 1, wherein the cement container (40) is filled with a single-component moisture hardening reaction cement on a polyurethane basis.

* * * * *